V. R. McDOLE & A. HOLLENBECK.
CORN HARVESTING DEVICE.
APPLICATION FILED DEC. 20, 1906.
901,989.
Patented Oct. 27, 1908.
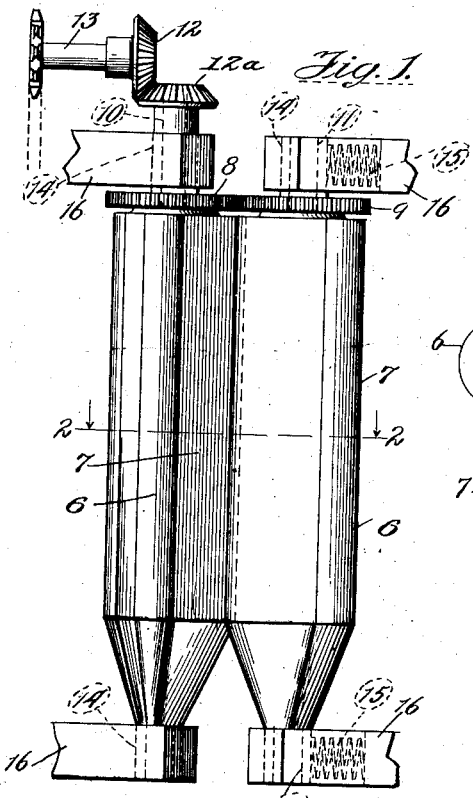
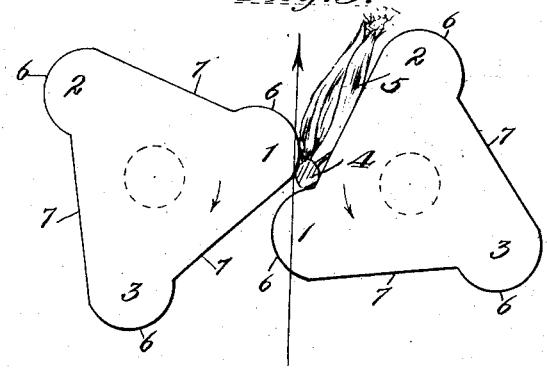
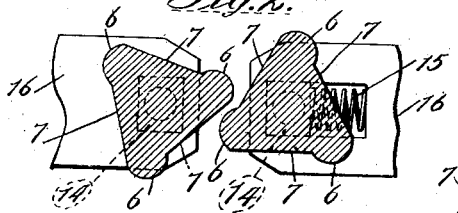
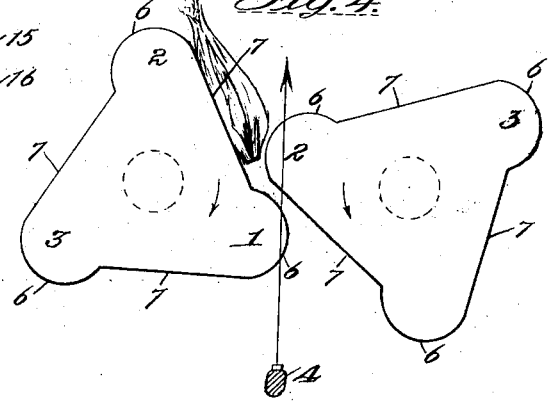

UNITED STATES PATENT OFFICE.

VERNARD R. McDOLE, OF AURORA, ILLINOIS, AND ALMERION HOLLENBECK, OF JANESVILLE, WISCONSIN.

CORN-HARVESTING DEVICE.

No. 901,989.  Specification of Letters Patent.  Patented Oct. 27, 1908.

Application filed December 20, 1906. Serial No. 348,681.

*To all whom it may concern:*

Be it known that we, VERNARD R. McDOLE, a citizen of the United States, residing at Aurora, in the county of Kane and State of Illinois, and ALMERION HOLLENBECK, a citizen of the United States, residing at Janesville, in the county of Rock and State of Wisconsin, have invented certain new and useful Improvements in Corn-Harvesting Devices, of which the following is a full, clear, and exact specification.

This invention relates to that part of corn harvesting machines which serves to grasp the stalk and snap the ear therefrom, and which in many forms of these machines comprises a pair of rolls arranged parallel, or substantially parallel, with each other, and provided with corrugated or toothed surfaces adapted to receive the stalks between them and to squeeze or snap the ears therefrom.

The primary object of this invention is to provide a device of this same general character which will embody improved means whereby the ear will be deflected with respect to the stalk and thereby broken from the stalk, without entirely depending upon the squeezing action characteristic of a pair of rolls acting upon a stalk with an ear thereon passing between them.

A further object of the invention is to provide a device of this general character which shall embody improved means whereby the ear will be given rapid or violent lateral deflection, first in one direction and then in the opposite direction, with respect to the stalk, in such a way as to cause it to break from the stalk.

A still further object of the invention is to provide a device of this general character which shall embody means whereby the ear will not only be deflected laterally with respect to the stalk, but will be subjected to the snapping or outwardly crowding action of the ordinary snapping rolls, in the event the vibratory action or deflection which the ear receives should fail to detach it from the stalk.

With a view to the accomplishment of these ends, and the attainment of certain other objects which will hereinafter appear, the invention consists in the features of novelty which will now be described with reference to the accompanying drawings, and more particularly pointed out in the claims.

In the said drawings,—Figure 1 is an elevation of a corn harvesting device embodying this invention. Fig. 2 is a cross-section thereof on the line 2—2, Fig. 1. Fig. 3 is a diagrammatic section showing the deflection of the ear in one direction, and Fig. 4 is a similar section showing the deflection in the opposite direction.

In carrying out the invention we employ two members, which, for the want of a better designation, may be termed rolls, and each of these is formed with longitudinal ribs 1, 2, 3, having substantially the shape in cross-section shown in Figs. 2, 3 and 4, or any other shape, in fact, which will enable the rolls to first grasp the corn-stalk, which is indicated at 4, and then deflect the ear, which is indicated at 5, laterally with respect to the stalk, in a manner somewhat analogous to that which would be employed by a person in breaking the ear from the stalk, and substantially as shown in the diagram. This end may be best accomplished by the form of ribs shown in the drawing, and each of which, as will be seen, has a rounded periphery 6 terminating at each end of its curvature in a flat or straight surface 7, and this straight surface 7 is of substantially the same length as the length of the rounded or curved surface 6, so that as the rolls are rotated in opposite directions the round part will roll together with the straight part, but preferably without touching, and preferably some considerable distance apart, so that the stalk may readily pass between them, the surfaces 7 of each roll being arranged in planes forming a triangle. The rolls are maintained in this relation by gear wheels 8, 9, mounted upon their respective shafts 10, 11, preferably at their upper or rear ends, accordingly as the rolls are arranged in an upright position or in a more or less horizontal position, and one of the shafts is driven to impart the described motion to the rolls by any suitable connection, such as bevel-gears 12, 12ª and shaft 13, having operative attachment to the ground wheels of the vehicle on which devices of this character are usually mounted, or they may be operated in any other way not necessary to illustrate, as the particular driving means does not in any way affect the principle of their operation. These longitudinal ribs 1, 2, 3, of the rolls, if desired, may be tapered at their lower ends, giving the rolls themselves a general tapering formation, if desired, to better encourage the introduction of the stalks between them, but this is not material, nor is it material whether the ribs be strictly parallel with the axes of the rolls, or more or less circumferential, or spiral. The rolls at their lower or forward ends, which are the tapered ends, are shown as stepped, or supported in suitable bearings 14, which if desired may be pressed towards each other by springs 15 mounted in the supports 16, in which the bearing-blocks 14 slide, in a familiar manner, to permit the rolls to separate more or less and yield when encountering stalks or objects of unusual thickness, the upper ends of the rolls being similarly journaled and supported, if desired.

By reference to the diagram shown in Fig. 3, it will be seen that when the stalk 4 is engaged by the rolls it is pinched or grasped by the round surface 6 and flat surface 7 where these two start to roll together, and then as the flat surface 7 of the roll on the right moves towards the left it causes the ear 5 to be deflected towards the left also without letting go the stalk and without permitting the ear itself to enter between the two surfaces of the rolls that are rolling together; as a consequence, it produces simultaneously a lateral breaking action and an outward squeezing action, the bite of the rolls against the stalk maintaining a firm hold upon it and causing it to move inward with respect to the rolls, while the space between the two surfaces that are rolling together is not sufficient to admit the ear itself, and the character of the formation of these two surfaces, which are gradually converging against the butt of the ear with their divergent sides outward, causes the aforesaid outward squeezing action that literally pulls the ear from the stalk. If, however, the severance of the ear from the stalk should not be accomplished by the time the outer end of the straight surface 7 on the right roll meets the inner end of the straight surface 7 on the left roll, the latter straight surface acting in conjunction with the curved surface 6 on the right roll will produce a deflection or bending of the ear in the opposite direction, or towards the right as illustrated by the positions of the parts in Fig. 4, and as these two straight and curved surfaces complete their coöperating action, they also will effect an outward squeezing or snapping action against the ear, should it still remain on the stalk. Thus, by properly speeding the rotation of the rolls to one or more hundred times a minute (more or less according to the requirements), it will be seen that a very rapid and effective wrenching or bending action may be produced on the stem of the ear where it connects with the stalk.

In order that the invention might be understood by those skilled in the art, the details of this embodiment thereof have been thus specifically described, but

What we claim as new therein and desire to secure by Letters Patent is:

1. In a device for the purpose described, the combination of a pair of contiguous rotary members adapted to receive the stalks between them, and provided with means for deflecting the ear of corn while on the stalk at an angle to the line of travel of said members, and means for rotating said members in opposite directions.

2. In a device for the purpose described, the combination of a pair of contiguous rotary members adapted to receive the stalk between them, said members having means for gripping the stalk between them, and means for deflecting the ear with respect to the stalk at an angle to the line of travel of the members, and means for rotating said members in opposite directions.

3. In a device for the purpose described, the combination of a pair of contiguous rotary members adapted to receive the stalk between them, having means for oscillating the ear on the stalk in opposite directions, and means for rotating said members in opposite directions.

4. In a device for the purpose described, the combination of a pair of contiguous rotary members adapted to receive the stalk between them, said members having co-acting faces adapted to engage the ear and deflect it laterally at an angle to the line of travel of the members, and means for rotating the members in opposite directions.

5. In a device for the purpose described, the combination of a pair of contiguous rotary members having longitudinal ribs provided with outwardly-curved peripheries and flat sides, the curved peripheries being arranged to oppose said flat sides, whereby the stalk will be received between the members and the ear will be deflected to one side of the line of travel of the members, and means for rotating said members in opposite directions.

6. In a device for the purpose described, the combination of two contiguous rolls having co-acting longitudinal ribs, the periphery of each of which is rounded and the sides of each of which are straight, the straight sides of each rib being arranged in plaens forming a triangle in cross section, and the rounded periphery of the rib of one roll being arranged opposite the straight side of the rib of the other roll, and means for rotating said rolls in opposite directions.

In testimony whereof we have signed our names to this specification, in the presence of two subscribing witnesses, on this 7th day of December, A. D. 1906.

VERNARD R. McDOLE.
  ALMERION HOLLENBECK.

Witnesses for McDole:
 CHAS. H. SEEM,
 J. H. JOCHUM, Jr.

Witnesses for Hollenbeck:
 W. O. NEWHOUSE,
 WM. McCUE.